United States Patent
Steinbach et al.

(10) Patent No.: US 9,720,557 B2
(45) Date of Patent: Aug. 1, 2017

(54) METHOD AND APPARATUS FOR PROVIDING ALWAYS-ON-TOP USER INTERFACE FOR MOBILE APPLICATION

(71) Applicant: CELLCO PARTNERSHIP, Basking Ridge, NJ (US)

(72) Inventors: Lodema Steinbach, Clayton, CA (US); Ashwin Kamath, San Ramon, CA (US); Zhijian Lin, Dublin, CA (US)

(73) Assignee: Cellco Partnership, Basking Ridge, NJ (US)

(*) Notice: Subject to any disclaimer, the term of this patent is extended or adjusted under 35 U.S.C. 154(b) by 226 days.

(21) Appl. No.: 14/010,088

(22) Filed: Aug. 26, 2013

(65) Prior Publication Data
US 2015/0058770 A1    Feb. 26, 2015

(51) Int. Cl.
*G06F 3/0481* (2013.01)
*G06F 9/44* (2006.01)
*G06F 3/01* (2006.01)
*G09G 5/14* (2006.01)

(52) U.S. Cl.
CPC .......... *G06F 3/0481* (2013.01); *G06F 9/4443* (2013.01); *G06F 3/017* (2013.01); *G06F 2203/04806* (2013.01); *G09G 5/14* (2013.01); *G09G 2340/12* (2013.01)

(58) Field of Classification Search
CPC ...... G06F 3/041; G06F 3/0481; G06F 3/0482; G06F 3/04842; G06F 3/04845; G06F 9/4443; G06F 17/30905; G06F 2203/0381; G06F 2203/04806; G09G 5/14; G06T 11/00

USPC ....... 715/759, 766, 767, 768, 783, 790, 791, 715/794, 797
See application file for complete search history.

(56) References Cited

U.S. PATENT DOCUMENTS

| | | | | |
|---|---|---|---|---|
| 5,675,755 | A | * | 10/1997 | Trueblood ................ 715/791 |
| 6,025,841 | A | * | 2/2000 | Finkelstein .......... G06F 3/0481 715/803 |
| 2007/0101290 | A1 | * | 5/2007 | Nakashima et al. .......... 715/797 |
| 2007/0143433 | A1 | * | 6/2007 | Daigle .......... 709/207 |
| 2009/0210817 | A1 | * | 8/2009 | Schmieder et al. .......... 715/781 |
| 2009/0248996 | A1 | * | 10/2009 | Mandyam et al. .......... 711/154 |
| 2010/0281422 | A1 | * | 11/2010 | Kano et al. .......... 715/790 |
| 2011/0179387 | A1 | * | 7/2011 | Shaffer .......... G06F 3/04883 715/835 |
| 2011/0267367 | A1 | * | 11/2011 | Tsai et al. .......... 345/629 |

(Continued)

OTHER PUBLICATIONS

Pin and Keep Any Window Always on Top With DeskPins (Jun. 26, 2010) http://www.technorms.com/487/pin-and-keep-any-window-always-on-top-with-deskpins.*

*Primary Examiner* — Rinna Yi

(57) ABSTRACT

An approach for providing an always-on-top user interface for a mobile application is described. An always-on-top module may provide an always-on-top user interface mode for a mobile application, wherein the always-on-top user interface mode presents at least one session of the mobile application in a user interface element that is always visible in a display of a mobile device. The always-one-top module may also receive an input for activating the always-on-top user interface mode for the mobile application. Further, the always-one-top module may render the user interface element for presenting the at least one session in the display of the mobile device.

20 Claims, 12 Drawing Sheets

(56) References Cited

U.S. PATENT DOCUMENTS

2012/0242692 A1* 9/2012 Laubach .................. 345/629
2013/0104065 A1* 4/2013 Stecher ................... 715/767
2013/0227472 A1* 8/2013 Sosinski ............ G06F 3/0481
                                                         715/794
2015/0058318 A1* 2/2015 Blackwell et al. .......... 707/722

* cited by examiner

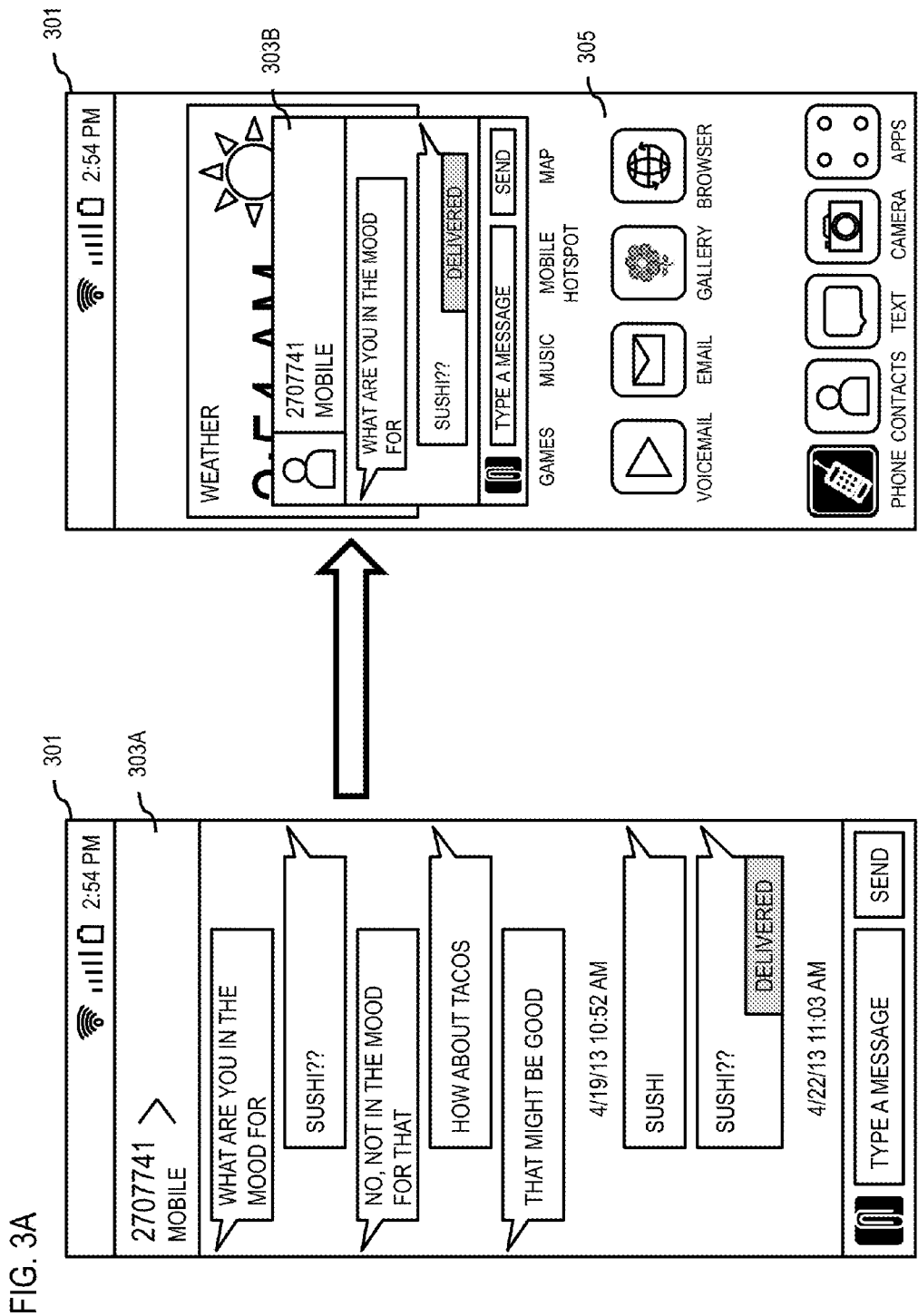

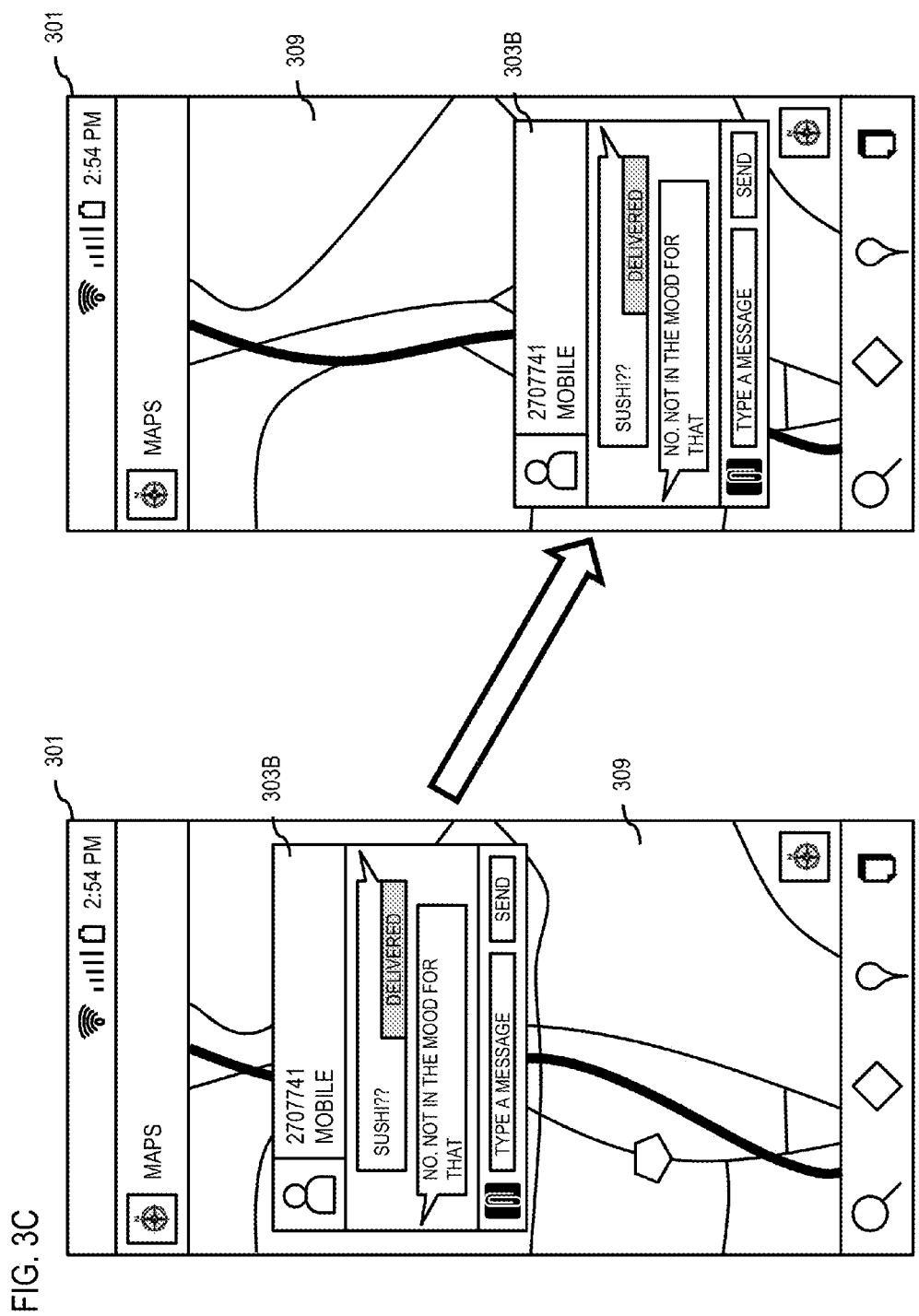

METHOD AND APPARATUS FOR PROVIDING ALWAYS-ON-TOP USER INTERFACE FOR MOBILE APPLICATION

BACKGROUND INFORMATION

Users are increasingly taking advantage of multi-tasking capabilities offered by modern mobile devices. However, the limited display areas on mobile devices often make multi-tasking between applications tedious and cumbersome. Moreover, a user may often forget or lose track of activities on one application when focus is shifted to another application. As a result, service providers and developers face significant technical challenges to enabling a user to multi-task across multiple applications while maintaining focus on those tasks or applications that are most important to the user.

Therefore, there is a need for providing an always-on-top user interface for a mobile application in a mobile device.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A-3E are illustrations of interactions with an always-on-top user interface, based on multi-touch gestures, utilizing the processes described in FIGS. 2A and 2B, according to various embodiments;

DESCRIPTION OF THE PREFERRED EMBODIMENT

A method, apparatus, and system for providing an always-on-top user interface for a mobile application are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to providing an always-on-top user interface for a mobile application, it is contemplated that these embodiments have applicability to other systems operated by different entities and to other operations wherein data is retrieved.

Figure 1A:
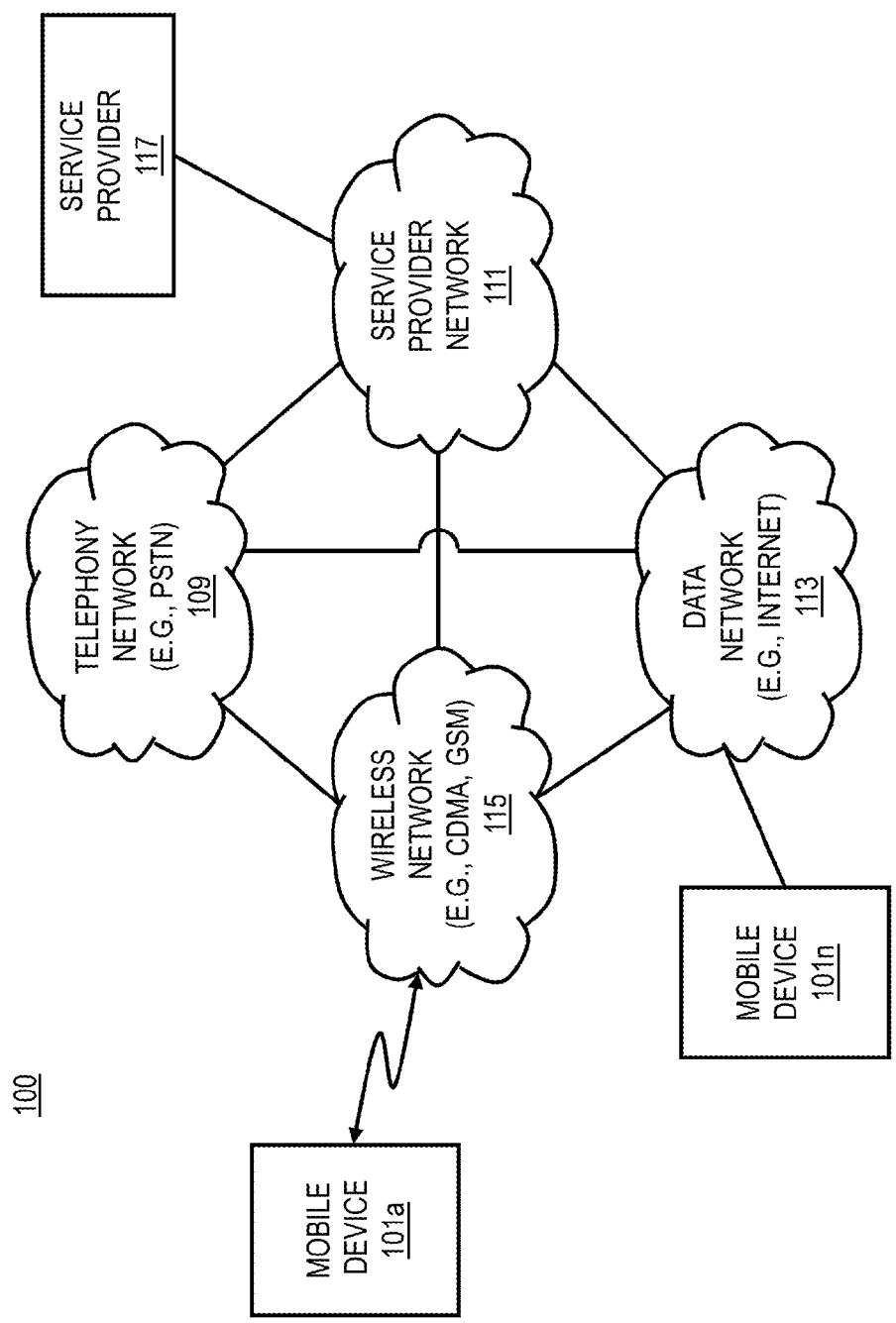
FIG. 1A is a diagram of a system capable of providing an always-on-top user interface for a mobile application, according to an exemplary embodiment.

FIG. 1A is a diagram of the system 100 capable of providing an always-on-top user interface for a mobile application, according to an exemplary embodiment. As noted above, multi-tasking is often challenging, tedious, and cumbersome for mobile device users because of, for instance, limited display areas, cumbersome methods for switching between active applications, and the like that are offered in mobile environments. Users often have to navigate from application screen to application screen in order to find and use a desired active application in a multi-tasking environment. For example, a user may be using a messaging application as one active application, but would then would like to conduct an internet search in another application (e.g., a browser application). In traditional approaches, the user would navigate away from the messaging application to the browser application, at which point the mobile device's display would switch to the browser application's user interface and completely obscure the messaging application user interface. As a result, users typically have to remember to return to the original application to continue where they left off. The challenge of remembering to return to the original messaging application and avoiding distractions by other multi-tasked applications becomes even greater as the number of simultaneous applications, notifications, etc. that the user is engaged with increases.

To address this problem, a system 100 of FIG. 1A introduces the capability to provide an always-on-top user interface mode for interacting with a mobile application in a multi-tasking environment. In one embodiment, the always-on-top user interface mode enables the mobile application to present a user interface element (e.g., a widget, a window, a bubble, etc.) that can be fixed to the user's display area so that the element is always visible to the user regardless of other applications that might be executing on the same mobile device. This capability, for instance, enables a user to maintain active sessions across applications in order to multi-task, such as awaiting an instant messaging reply or searching for music while the user continues to manage other activities or tasks in other active applications.

In one embodiment, the always-on-top user interface mode can be implemented as a mobile operating system enhancement or modification. In addition or alternatively, the always-on-top user interface mode can be implemented as a middleware layer, natively in the application itself, or a combination thereof.

In one embodiment, the system 100 enables a user to provide input for activating the always-on-top user interface mode of a mobile application by gesture-based interactions. For example, when a user is using an application (e.g., a messaging application), the user can perform a shrink gesture (e.g., a three finger shrink gesture by moving three fingers together on the surface of the display) to indicate that the application should now be displayed via the smaller always-on-top user interface element (e.g., a widget). The user can then perform a drag gesture or operation to move the always-on-top user interface element to a desired position in the display or home screen. Once dragged to the location, the always-on-top user interface element is fixed to that location in the display as the user continues to multi-task in other applications or processes.

In one embodiment, the system 100 can determine how to render the always-on-top user interface element (e.g., determine the size, position, zoom level, color, transparency, etc.) based on what other user interface elements of other applications are visible in the display. In one embodiment, the system 100 can also determine the rendering characteristics of the always-on-top user interface element based on the content presented in the other user interface elements. For example, the system 100 can position or size the always-on-top user interface so that it does not obscure important content or content that is otherwise a focus of the user.

As shown in FIG. 1A, in one embodiment, the system 100 comprises mobile devices 101a-101n (collectively, mobile devices 101), networks 109-115 (telephony network 109, service provider network 111, data network 113, and wireless network 115), and a service provider 117.

In one embodiment, the mobile devices 101 include the components for supporting an always-on-top mode of operation for mobile applications (e.g., a mobile operating system 103, a mobile application 105, and an always-on-top module 107) as described in more detail with respect to FIG. 1B below. In one embodiment, the mobile devices 101 may include any type of mobile computing device comprising a mobile phone, smart phone, watch phone, tablet computer, wearable computer, etc. It is also contemplated that the mobile devices 101 may support any type of interface for the presentation or exchange of data. In addition, the mobile devices 101 may facilitate various input means for receiving and generating information, including touch screen capability, keyboard and keypad data entry, voice-based input mechanisms, and the like. Any known and future implementations of the mobile devices 101 are applicable to the various embodiments described herein. It is noted that, in certain embodiments, the mobile devices 101 may be configured to transmit information using a variety of technologies (e.g., near field communication (NFC), radio-frequency identification (RFID), WiFi, Bluetooth®, infrared, etc.). Also, connectivity may be provided via a wired or wireless local area network (LAN). The mobile devices 101 may exchange data through networks 109-115 while mobile applications are running on the mobile device 101.

In one embodiment, the networks 109-115 may include any suitable wire line and/or wireless network, and may be managed by one or more service providers. For example, telephony network 109 may include a circuit-switched network, such as the public switched telephone network (PSTN), an integrated services digital network (ISDN), a private branch exchange (PBX), or other like network. Wireless network 115 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), long term evolution (LTE) networks, wideband code division multiple access (WCDMA), wireless fidelity (WiFi), satellite, and the like. Meanwhile, data network 113 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, the networks 109-115 may be completely or partially contained within one another, or may embody one or more of the aforementioned infrastructures. For instance, service provider network 111 may embody circuit-switched and/or packet-switched networks that include facilities to provide for transport of circuit-switched and/or packet-based communications. It is further contemplated that the networks 109-115 may include components and facilities to provide for signaling and/or bearer communications between the various components or facilities of system 100. In this manner, the networks 109-115 may embody or include portions of a signaling system 7 (SS7) network, or other suitable infrastructure to support control and signaling functions.

In one embodiment, the service provider 117 may include any entities or nodes that provide services to the mobile device 101 by exchanging data with the mobile device 101 through the networks 109-115. The service provider 117 may provide a mobile application downloadable to the mobile device 101 and operable in connection with the service provider 117. The mobile device 101 may be able to connect to a server provided by the service provider 117 and exchange data with the server via the mobile application. The services provided by the service provider 117 may be rendered on a user interface of the mobile application installed in the mobile device 101. The mobile device 101 may connect to the service provider 117 via other mobile application other than the mobile application provided by the service provider 117.

Figure 1B:
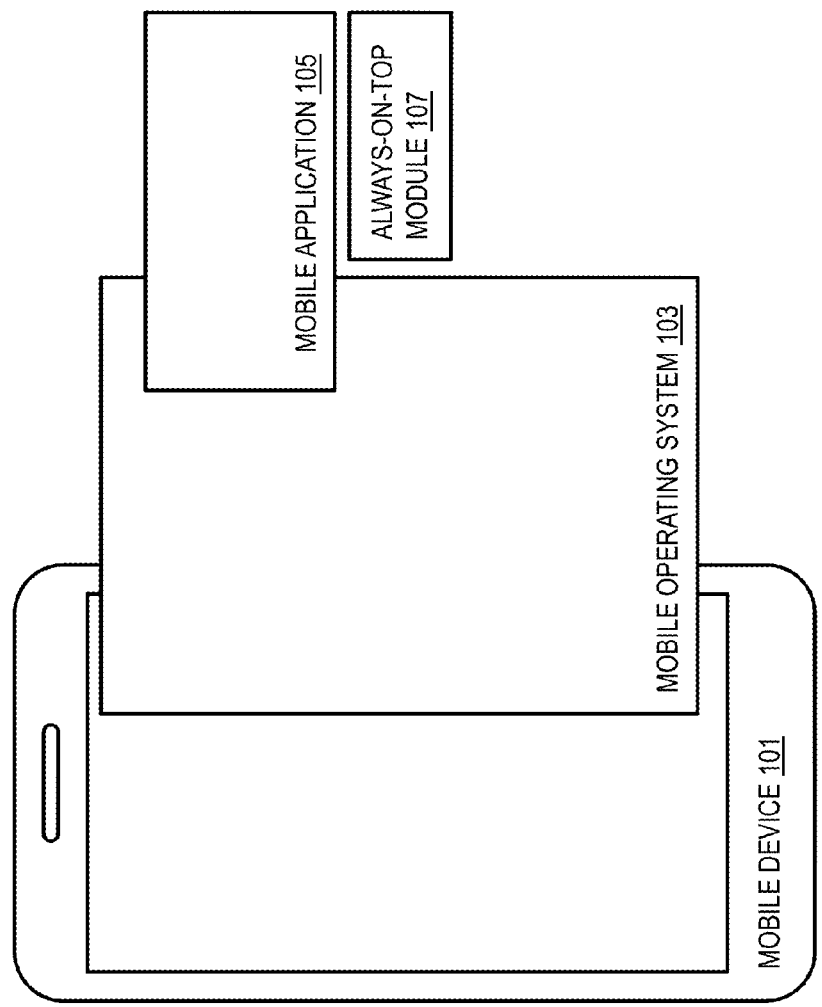
FIG. 1B is a diagram of components of a mobile device capable of providing an always-on-top user interface for a mobile application, according to an exemplary embodiment.

FIG. 1B is a diagram of components of the mobile device 101 capable of providing an always-on-top user interface for a mobile application, according to an exemplary embodiment. In one embodiment, the mobile device 101 may comprise a mobile operating system 103, a mobile application 105, and an always-on-top module 107.

In one embodiment, the mobile operating system 103 may include any mobile operating system (OS) that operates the mobile device 101. The mobile operating system 103 may utilize features of the mobile device 101, including: touch screen, cellular, Bluetooth®, WiFi, GPS mobile navigation, camera, video camera, speech recognition, voice recorder, music player, NFC, infrared, etc. Some examples of the mobile operating system 103 include: Android®, iOS®, Symbian®, Windows Phone®, Windows Mobile®, BlackBerry® OS, Bada®, and other open or closed source operating systems. The mobile operation system 103 may support or provide the functions of the always-on-top module 107 natively or be enhanced (e.g., via additional modules, application programming interfaces, etc.) to support the always-on-top module 107.

In one embodiment, the mobile application 105 may include any software application designed to run on the mobile device 101. In one embodiment, the mobile application 105 can provide the functions of the always-on-top module 107 in addition to or in place of the mobile operating system 103 support for the functions. The mobile application 105 may be available through an application distribution platform associated with the mobile operating system 103 (e.g., App Store®, Google Play®, Windows Phone Store®, BlackBerry App World®, etc.). The mobile application 105 may be downloaded from the application distribution platform to the mobile device 101. The mobile application 105 may include numerous applications, in various categories, related to, for example, email, calendar, contacts, stocks, weather, games, music, navigation, location-based services, bank, finance, messenger, shopping, news, social networking, entertainment, etc.

Figure 2A:
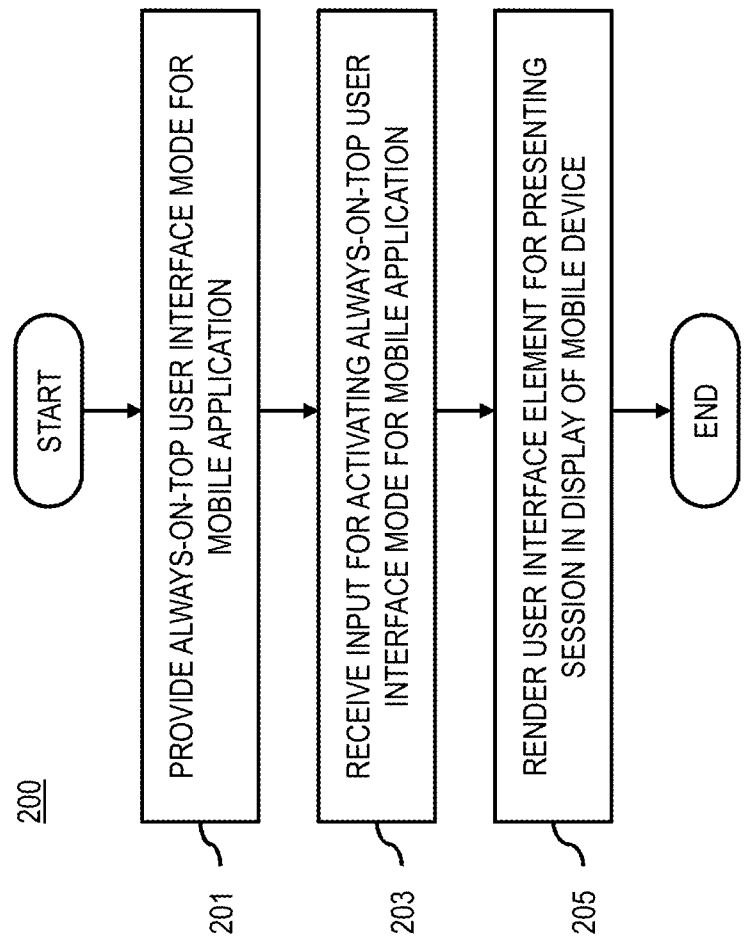
FIG. 2A is a flowchart of a process for providing an always-on-top user interface for a mobile application, according to an exemplary embodiment.
Figure 2B:
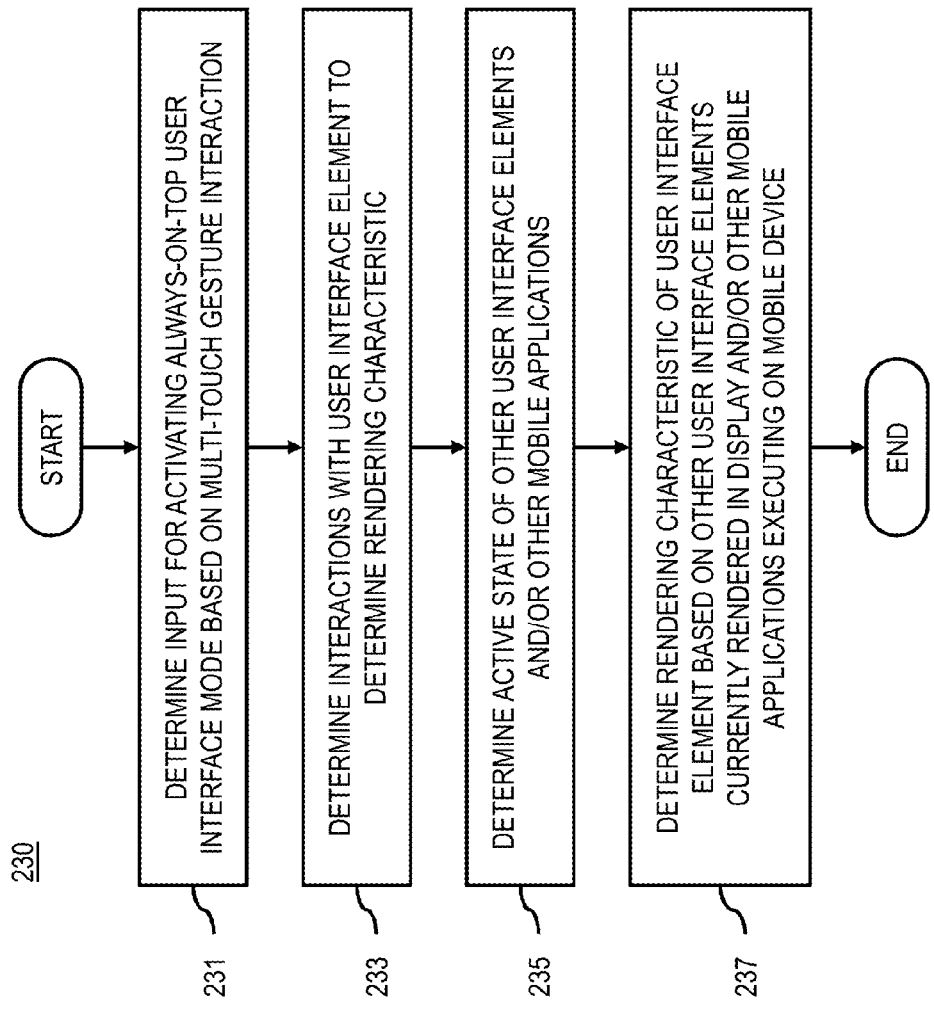
FIG. 2B is a flowchart of a process for providing an always-on-top user interface mode for a mobile application, according to another exemplary embodiment.

In one embodiment, the always-on-top module 107 may perform processes 200 and 230 shown in FIGS. 2A and 2B. The always-on-top module 107 may be embedded in the mobile device 101, the mobile operating system 103, and/or the mobile application 105. The always-on-top module 107 may cause a user interface (or a widget) of one mobile application 105 to always be visible on a display of the mobile device 101, while other applications of the mobile application 105 are running. In one embodiment, the always-on-top module 107 may cause more than one mobile application 105 to be visible on the display of the mobile device 101. In that way, the system 100 may allow multi-tasking as users of the mobile device 101 can maintain active sessions (e.g., awaiting an instant message or searching for music) in one or more of mobile application 105, while they manage other activities in other mobile applications.

In one embodiment, the always-on-top module 107 may enable or disable an always-on-top user interface mode for the mobile application 105. The always-on-top user interface mode may present a session of the mobile application 105 in a user interface element that is always visual on the display of the mobile device 101. The always-on-top user interface may be enabled or disabled based on user input, including multi-touch gestures received through the mobile device 101's display.

Figure 1C:
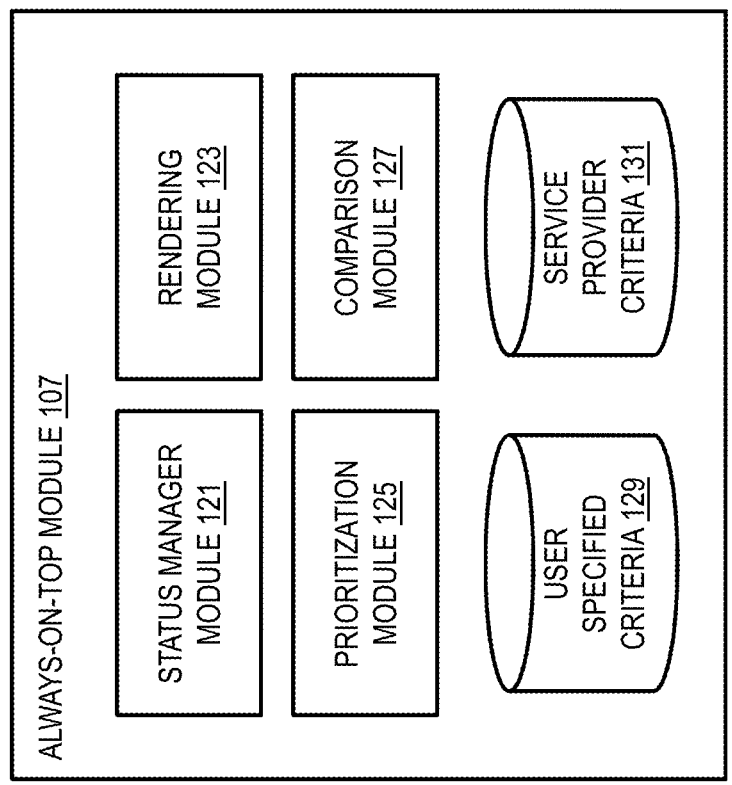
FIG. 1C is a diagram of an always-on-top module utilized in the mobile device of FIG. 1B, according to an exemplary embodiment.

FIG. 1C is a diagram of the always-on-top module 107 utilized in the mobile device 101 of FIG. 1B, according to an exemplary embodiment. In one embodiment, the always-on-top module 107 may comprise a status manager module 121, a rendering module 123, a prioritization module 125, a comparison module 127, a user specified criteria 129, and a service provider criteria 131.

In one embodiment, the status manager module 121 may manages the status (e.g., (active/inactive status) of a user interface element and/or a mobile application 105. The status manager module 121 may determine and update the status as to whether the user interface element and/or the mobile application 105 is active or inactive. The status manager module 121 may determine the status of the user interface element and/or the mobile application 105 based on the user specified criteria 129 and/or the service provider criteria 131.

In one embodiment, the prioritization module 125 may determine priorities among the user interface elements that are currently running regardless of whether active or inactive. The prioritization module 125 may determine the priorities based on the user specified criteria 129 and/or the service provider criteria 131. For example, the priorities may be determined based on frequency of usage or active/inactive state of the user interface elements.

In one embodiment, the comparison module 127 may compare the user interface elements currently running based on the active/inactive status (determined by the status manager module 121) and the priority (determined by the prioritization module 125). Further, the user interface elements may be compared based on other criteria included in the user specified criteria 129 and/or the service provider criteria 131.

In one embodiment, the rendering module 123 may render the user interface elements in a display of the mobile device 101 based on the active/inactive status and the priority. The user interface element with the highest priority may be rendered at the forefront of the display. Further, the rendering module 123 may render the user interface elements based on rendering characteristics and/or other criteria included in the user specified criteria 129 and/or the service provider criteria 131.

In one embodiment, the user specified criteria 129 and/or the service provider criteria 131 may include priority criteria, active/inactive state criteria, rendering characteristics criteria, always-on-top mode triggers, etc. The user specified criteria 129 may be pre-determined or modified by the user on a setting/configuration mode of the mobile application 105. The service provider criteria 131 may be pre-determined by the service provider 117 as the mobile application 105 is developed or may be modified by the service provider 117 through the networks 109-115 after the mobile application 105 is installed into the mobile device 101.

Figure 5:
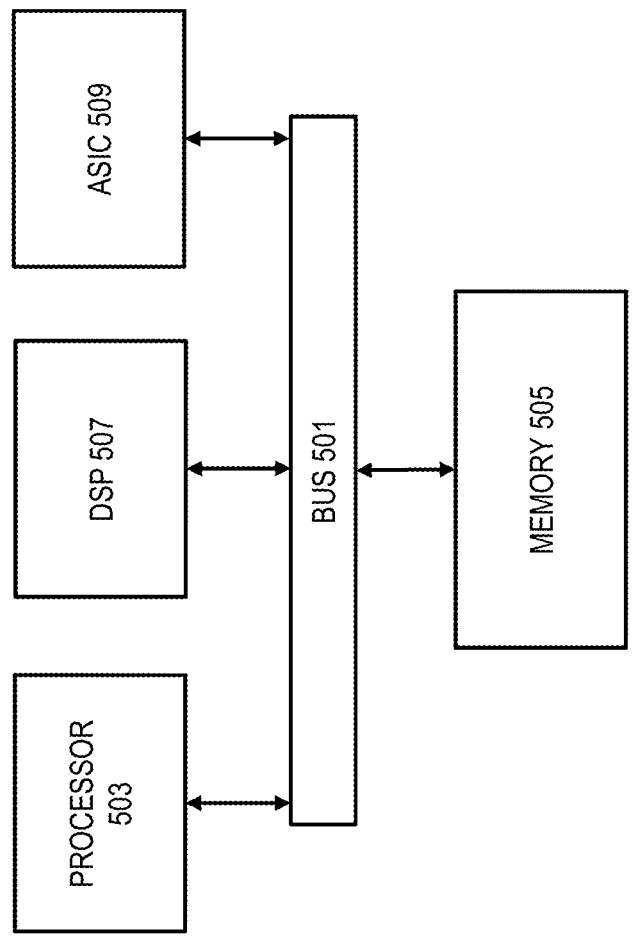
FIG. 5 is a diagram of a chip set that can be used to implement various exemplary embodiments.

FIG. 2A is a flowchart of a process 200 for providing an always-on-top user interface for a mobile application, according to an exemplary embodiment. In one embodiment, the always-on-top module 107 may perform the process 200 and may be implemented in, for instance, the mobile application 105, the mobile operating system 103, the mobile device 101 comprising a chip set including a processor and a memory as shown in FIG. 5.

In step 201, the always-on-top module 107 may provide an always-on-top user interface mode for the mobile application 105, wherein the always-on-top user interface mode presents at least one session of the mobile application 105 in a user interface element that is always visible in a display of the mobile device 101. The always-on-top user interface mode may be enabled or disabled based on a pre-selection (or pre-setting) by a user or prompt user input, including a multi-touch gesture on the mobile device 101. For example, a message window of a messenger application may be always rendered in the forefront in the display of the mobile device 101 when the always-on-top user interface mode is enabled. According to one embodiment, a multi-touch gesture (e.g., long press) on the message window (or an icon on the message window) may enable the always-on-top user interface mode. Alternatively, the always-on-top user interface mode may be changed by going into the settings of the mobile application 105 (or the mobile device 101) and selecting enabling/disabling options for the always-on-top user interface mode.

In one embodiment, the user interface element may include a widget. The widget may include a generic type of software application comprising portable code intended for one or more different software platforms. For example, the widget for one mobile application 105 may be compatible with various types of the mobile operating system 103 and the mobile device 101. The widget may be an application, a user interface element, or both, that is light, simple and easy to use, as opposed to a more complete software package. The widget may provide a single-purpose service as an interactive virtual tool. Some examples of services provided by the widget may include the weather, the time, a calendar, a map, notes, photo viewers, a messenger, search engines, emails, news, etc. The widget may maximize the screen real estate on the mobile device 101, and may be useful in placing live, data-rich applications on the mobile device 101. For example, a messenger widget of a messenger application may always be rendered in the forefront in the display of the mobile device 101 when the always-on-top user interface mode is enabled.

In one embodiment, the always-on-top user interface mode may be supported natively by the mobile application 105, the mobile operating system 103, or both. In one embodiment, the always-on-top module 107 may be embedded in the mobile application 105 so that the user interface element of the mobile application may be always rendered in the forefront of the display, even if the mobile operating system 103 does not support the always-on-top user interface mode or is not embedded with the always-on-top module 107. In other embodiment, the always-on-top module 107 may be embedded in the mobile operating system 103 so that the user interface element of the mobile application may always be rendered on the forefront, even if the mobile application 105 does not support the always-on-top user interface mode or is not embedded with the always-on-top module 107. In another embodiment, the always-on-top module 107 may be embedded in both the mobile operating system 103 and the mobile application 105 so that the user interface element of the mobile application may always be rendered on the forefront of the display.

In step 203, the always-on-top module 107 may receive an input for activating the always-on-top user interface mode for the mobile application 105. The input for activating the always-on-top user interface may be based on an input received through a keypad or a touch screen of the mobile device 101. The input received through the touch screen may include a multi-touch gesture (e.g., long press on the user interface). As explained above, the input for activating the always-on-top user interface may be based on input received through the settings of the mobile application 105, or the mobile device 101.

In step 205, the always-on-top module 107 may render the user interface element for presenting the at least one session in the display of the mobile device 101. For example, a message window or widget for a messenger application presenting a messaging session may always be rendered on the forefront of the display of the mobile device 101.

FIG. 2B is a flowchart of a process 230 for providing an always-on-top user interface mode for a mobile application, according to another exemplary embodiment. In one embodiment, the always-on-top module 107 may perform the process 230 and may be implemented in, for instance, the mobile application 105, the mobile operating system 103, the mobile device 101 comprising a chip set including a processor and a memory as shown in FIG. 5.

In step 231, the always-on-top module 107 may determine the input for activating the always-on-top user interface mode based on a multi-touch gesture interaction. As explained above, the multi-touch gesture interaction for activating the always-on-top user interface may include a long or short press on a portion of the touch screen of the mobile device 101 corresponding to the user interface element (e.g., whole or part of the user interface including user interface window, icon, button, etc.). For example, as a user long-presses or short-presses a messenger window or an icon in the messenger window of a messenger application (mobile application 105), the always-on-top module 107 may determine the press as input and activate the always-on-top user interface mode based on the input.

In step 233, the always-on-top module 107 may determine one or more interactions with the user interface element to determine the rendering characteristic. Based on user interactions with the user interface element of the mobile application 105 (e.g., multi-touch gesture on a touch screen of the mobile device 101), the rendering characteristic may be determined. In one embodiment, the rendering characteristic may include a position in the display, a size, a zoom level, etc. For example, when a multi-touch gesture of a long-press and drag on a user interface element is determined, the position of the dragged user interface element may be determined. Once the position of the dragged user interface element has been determined, the user interface element may be rendered on the dragged position. Also, when a multi-touch gesture of a shrink and grab on a user interface element is determined, a size and a zoom level of the shrunk user interface element may be determined. Then, the user interface element may be rendered in the size and the zoom level. The rendering of the user interface element always on the forefront may not be affected by the rendering characteristic, as long as the always-on-top user interface mode is activated. For example, the user interface element may always be rendered in the forefront, even if the position or the size of the user interface element is changed.

In step 235, the always-on-top module 107 may determine an active state of the one or more other user interface elements, the one or more other mobile applications, or both. For example, the other mobile application (mobile application 105) and/or the other user interface element of the other mobile applications may be active or running concurrently with the mobile application 105 and/or the user interface element, which is always rendered in the forefront, over renderings of the other mobile application and/or other user interface element. In other words, the other mobile applications and/or other user interfaces' renderings may remain in the background while the mobile applications and/or the user interfaces are rendered in the forefront. In one embodiment, the other mobile applications and/or the other user interfaces may assume an inactive state if they are not active for a pre-set period of time. According to one embodiment, the inactive background mobile applications may appear blurred to indicate to the user that the application is currently inactive.

In one embodiment, the status manager module 121 may check whether the one or more other user interface elements and/or the one or more other mobile applications are active or inactive based on the user specified criteria 129 and/or the service provider criteria 131. The user specified criteria 129 and/or the service provider criteria 131 may specify a threshold value for active or inactive status. For example, the user or the service provider 117 may set a threshold value for inactive time (e.g., 1, 3, 5, 10 or 15 minutes). If a user interface element and/or a mobile application 105 are not in use for the threshold inactive time, the status of the user interface element and/or the mobile application 105 may change to inactive status. The inactive state may change back to the active state as the user interface element and/or the mobile application are back in use. The user interface element and/or the mobile application 105 may be determined to be not in use, for example, when there is no or decreased user input, data being processed in the background, exchange of data, etc. More than one user interface element and/or mobile application 105 may be determined to be active at the same time, or only one interface element and/or mobile application may be determined to be active at a time. The status of the user interface element and/or mobile application 105 may be updated constantly or for every cycle (threshold value based on the user specified criteria 129 and/or the service provider criteria 131). In one embodiment, the status of the mobile application 105 may be determined by a task manager of the mobile operating system 103. The task manager of the mobile operating system 103 may constantly check for status, CPU usage, etc. of the mobile application 105. The status determined by the task manager of the mobile operating system 103 may be accessed by the status manager module 121, and may be further analyzed based on the user specified criteria 129 and/or the service provider criteria 131.

In step 237, the always-on-top module 107 may determine a rendering characteristic of the user interface element based on one or more other user interface elements currently rendered in the display, one or more other mobile applications executing on the mobile device, or both. For example, if other user interfaces elements are currently rendered in the display or other mobile applications (mobile application 105) are executed on the mobile device, the rendering characteristics (e.g., a position in the display, a size, a zoom level, etc.) may be determined so that the user interface element is rendered always in the forefront, over renderings of the other mobile applications and/or other user interface elements based on the rendering characteristics. In one embodiment, the user interface element may be determined to always be rendered transparently in the forefront, over the other user interfaces element.

In one embodiment, the comparison module 127 may compare the user interface element, which is always visible in the display of the mobile device 101, with the other user interface element and/or the other mobile application 105. The comparison module 128 may determine the active status of the user interface element and the other user interface element and/or other mobile application 105 through the status manager module 121 and may determine the priority of the user interface element and the other user interface element and/or other mobile application 105 through the prioritization module 125. The prioritization module 125 may determine the priority of the user interface element and the other user interface element and/or other mobile application 105 based on the user specified criteria 129 and/or the service provider criteria 131. The user specified criteria 129 and/or the service provider criteria 131 may include priority criteria. For example, the user or the service provider 117 may set the priority to be based on frequency of usage of the mobile application 105. In this case, a frequently used user interface element and/or mobile application may be given priority over a less frequently used user interface element and/or mobile application. In such way, the prioritization module 125 may determine priorities for the user interface elements and/or the mobile applications as they are compared by the comparison module 127. The priority criteria may also include types/categories of the mobile applications. One type of mobile application may be prioritized over other types of mobile applications. For example, a messenger application or a game application, which usually requires frequent user interactions (especially on the touch screen), may be prioritized over a music player application or a mapping application, which usually does not require frequent user interactions and can be run in the background of the display.

In one embodiment, the rendering module 123 may render the user interface element and the other user interface element based on the priority determined by the prioritization module 125. For example, a user interface element with the highest priority may be rendered at the forefront of the display, and other user interface elements with lower priority may be rendered behind the user interface element in order of the priority. More than one user interface element may have the highest priority and rendered at the forefront of the display at the same time. The rendering module 123 may determine the rendering characteristics based on the priority of the user interface elements. Further, the rendering module 123 may render the user interface element based on the rendering characteristics (e.g., a position in the display, a size, a zoom level, etc.).

In one embodiment, the rendering characteristics of the user interface element may be further based on the active state determined in step 235. For example, when two user interface elements has the same priority determined by the prioritization module 125 and they are to be rendered in a same or overlapping position, a user interface element in active state may be prioritized over other user interface element in inactive state. Thus, the rendering characteristics of the user interface element may be determined based on the priority based on the active state. In one embodiment, the rendering module 123 may determine the rendering characteristics based on specifications (e.g., supported resolution, display size, display type, rendering speed, touch input methods, etc.) of the mobile device 101, the mobile operating system 103, and the mobile application 105.

FIGS. 3A-3E are illustrations of interactions with an always-on-top user interface, based on multi-touch gestures, utilizing the processes described in FIGS. 2A and 2B, according to various embodiments.

FIG. 3A illustrates a shrink and grab gesture on an always-on-top user interface element, according to one embodiment. In one embodiment, a full screen always-on-top user interface element 303A for a messenger application is rendered on a touch screen of a display 301 of a mobile device 101. The full screen always-on-top user interface element 303A may be shrunk into a reduced always-on-top user interface element 303B as a multi-finger touch of a shrink and grab gesture on the full screen always-on-top user interface element 303A is received. Then, a user interface for a home screen 305 may be displayed in the background while the reduced always-on-top user interface element 303B is always displayed in the forefront of the display 301. The reduced always-on-top user interface element 303B may be enlarged (or expanded) to various sizes according to the user's preferences, including returning to the full screen always-on-top user interface element 303A, when a multi-finger touch of an enlarge (or expand) gesture is received. With the always-on-top user interface mode enabled, the always-on-top user interfaces elements 303A and 303B are always rendered in the forefront of the display 301. For example, while engaging a messaging client, a user may simultaneously shrink and grab (e.g., with three-finger) the messaging conversation window (widget) for the messaging client and drag the widget into the home screen of the display. Once the widget is dragged to the final desired position, the widget may be fixed on the display (always on top), at the final position as the user browses other applications or multi-tasks on the display. In that way, a user can maintain an active conversation, such as awaiting an instant reply, while managing other activities.

Figure 3B:
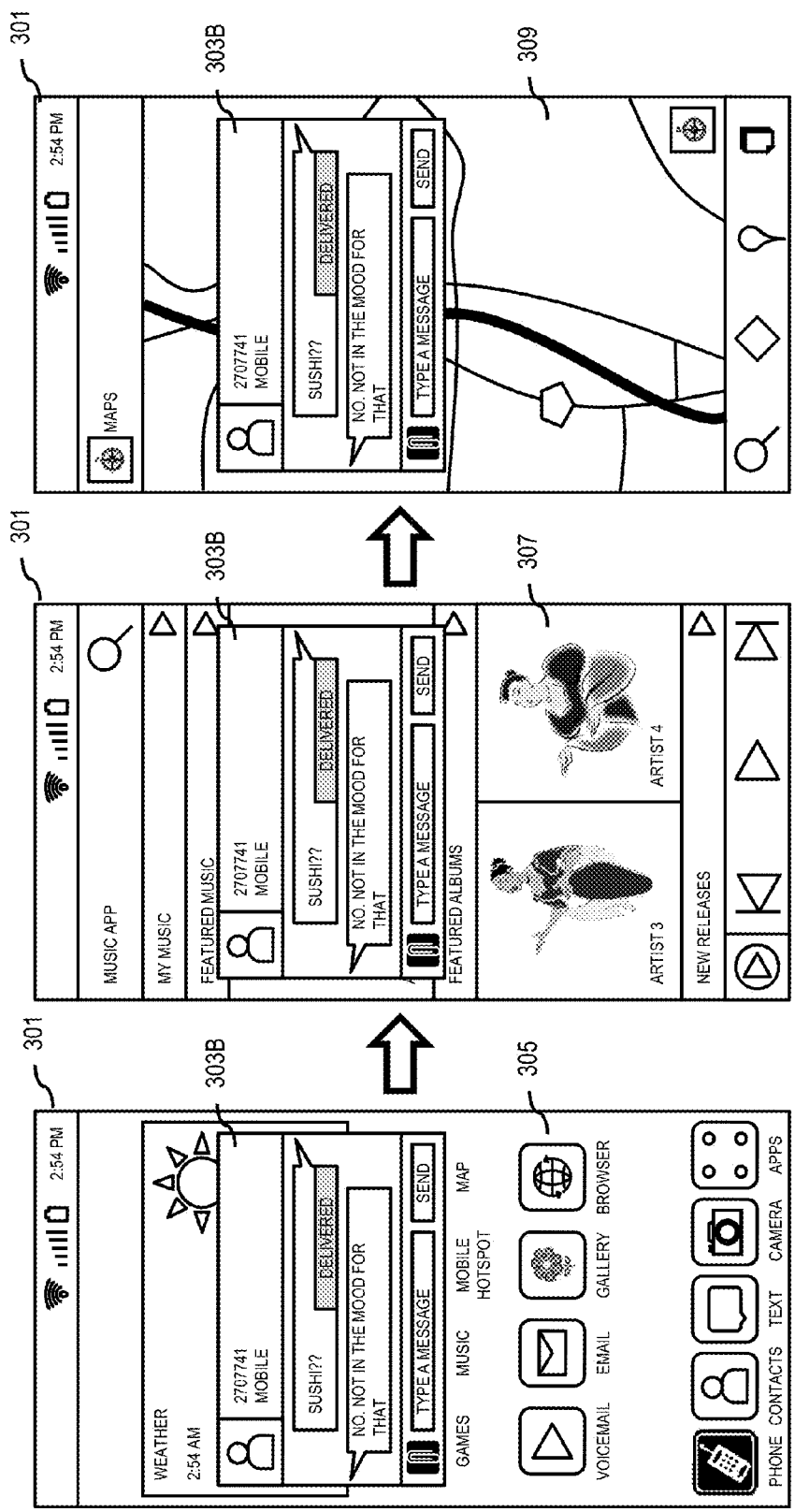

FIG. 3B illustrates an always-on-top user interface locked to the forefront of a display as a user may switch from various screens displaying various renderings from a variety of applications and backgrounds, according to one embodiment. In one embodiment, with the always-on-top user interface mode enabled, the always-on-top user interface element 303B may always be rendered in the forefront of the display 301 when a user interface for a home screen 305, a user interface for a music application 307, and a user interface for a mapping application 309 are rendered from one screen to another. The always-on-top user interface element 303B may always be rendered in the forefront of the display 301 regardless of activating or rendering of other user interfaces of the other applications (user interface for a home screen 305, user interface for a music application 307, and user interface for a mapping application 309). In that way, the always-on-top user interface element 303B may be displayed as if it is locked to the forefront of the display while a user may switch from screen to screen with other user interfaces of the other applications are concurrently utilized and rendered in the background.

FIG. 3C illustrates a long press and drag gesture on an always-on-top user interface, according to one embodiment. In one embodiment, as a multi-touch input of a long press gesture is received through a touch screen of the display 301, the always-on-top module 107 may determine that the always-on-top user interface element 303B is about to move from the current position. Then, when a multi-touch input of a drag gesture is received through the touch screen of the display 301, the always-on-top module 107 determines the changes of the position of the multi-touch input. The always-on-top user interface element 303B is always rendered in the forefront of the display 301 while the always-on-top user interface element 303B is rendered on the changed positions. When no more changes of the position are determined, the always-on-top module 107 determines the final position and renders the always-on-top user interface element 303B based on the final position. In that way, the always-on-top user interface element 303B may be displayed as if it is moved from one position to another while the other application and the other user interface for the mapping application 309 are concurrently utilized and rendered in the background of the display 301.

Figure 3D:
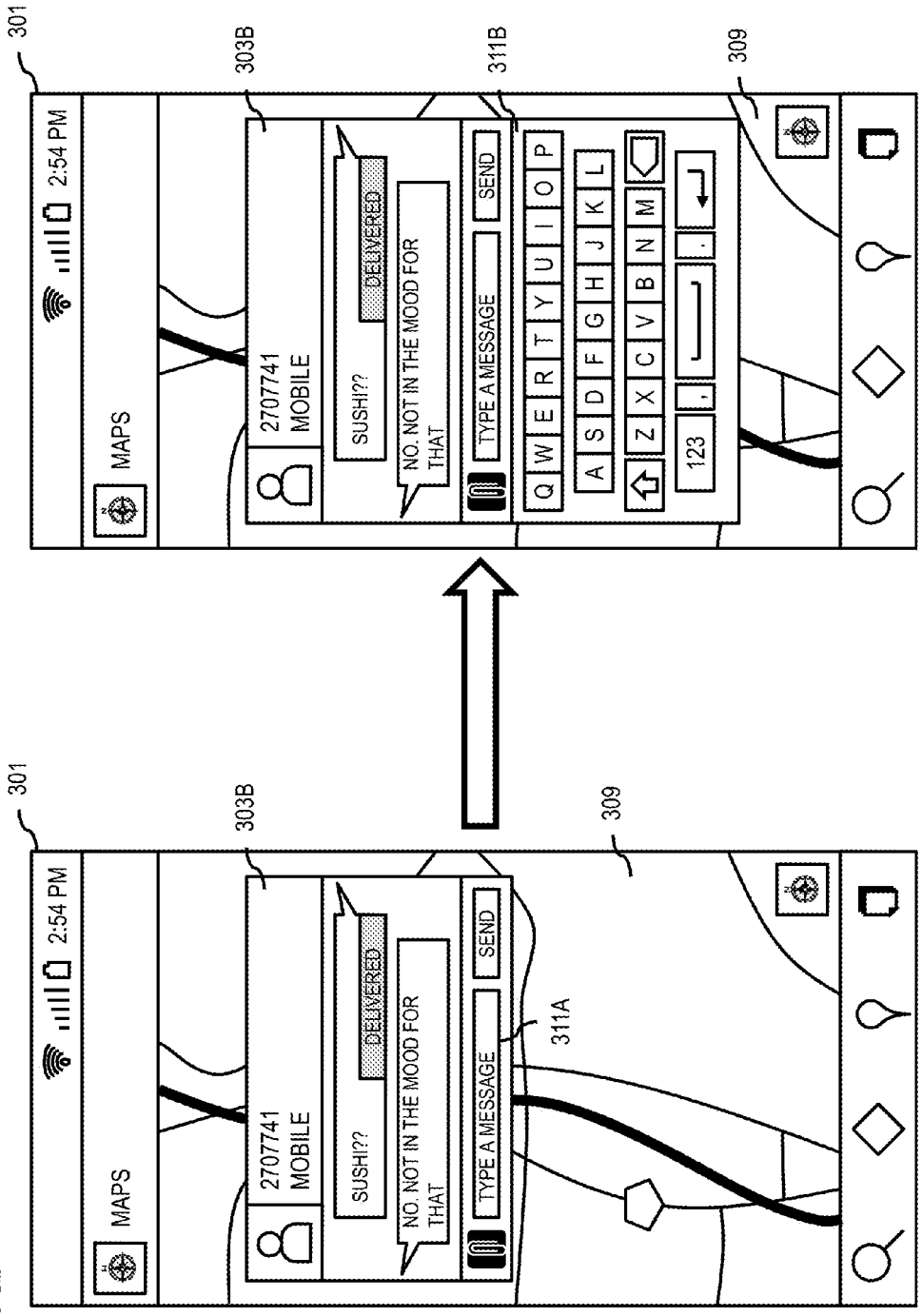

FIG. 3D illustrates an active interaction with an always-on-top user interface, according to one embodiment. In one embodiment, while the always-on-top user interface element 303B is always rendered in the forefront of the display 301 and active, the user can interact with the always-on-top user interface element 303B promptly with immediate access to the always-on-top user interface. As a multi-touch input of a type-in gesture is received (such as touching the type-in message box user interface element 311A), a virtual keyboard user interface element 311B associated with the always-on-top user interface element 303B may be rendered in the forefront of the display 301 along with the always-on-top user interface element 303B. The user can actively interact with the always-on-top user interface element 303B by utilizing the virtual keyboard user interface element 311B while the user interface for the mapping application 309 is active and rendered in the background of the display 301. The virtual keyboard user interface element 311B may disappear when it is determined that the user is finished with sending messages. In that way, the user can promptly respond to an active conversation or thread without having to find the application among other currently active applications and bringing the application to the forefront and reload to the conversation or thread.

Figure 3E:
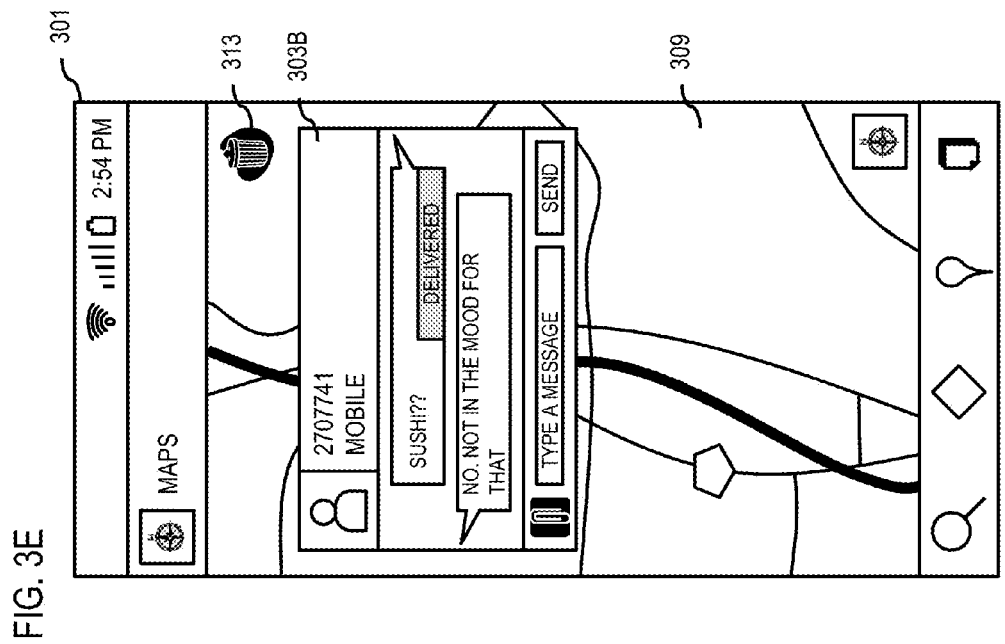

FIG. 3E illustrates a close gesture on an always-on-top user interface, according to one embodiment. In one embodiment, the always-on-top user interface element 303B may be closed when a multi-touch input of a drag gesture drags the always-on-top user interface element 303B to a trash box icon user interface element 313. In one embodiment, such gestures may not completely close the always-on-top user interface element 303B, but may only disable the always-on-top interface mode so that the always-on-top user interface element 303B is no longer always rendered over the user interface for the mapping application 309. In one embodiment, other close gestures, such as long pressing and moving the always-on-top user interface element 303B to out of the display 301, or touch pressing on an 'x' mark on the always-on-top user interface element 303B, may close the always-on-top interface or disable the always-on-top interface mode.

The processes described herein for providing an always-on-top user interface for a mobile application may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 4:
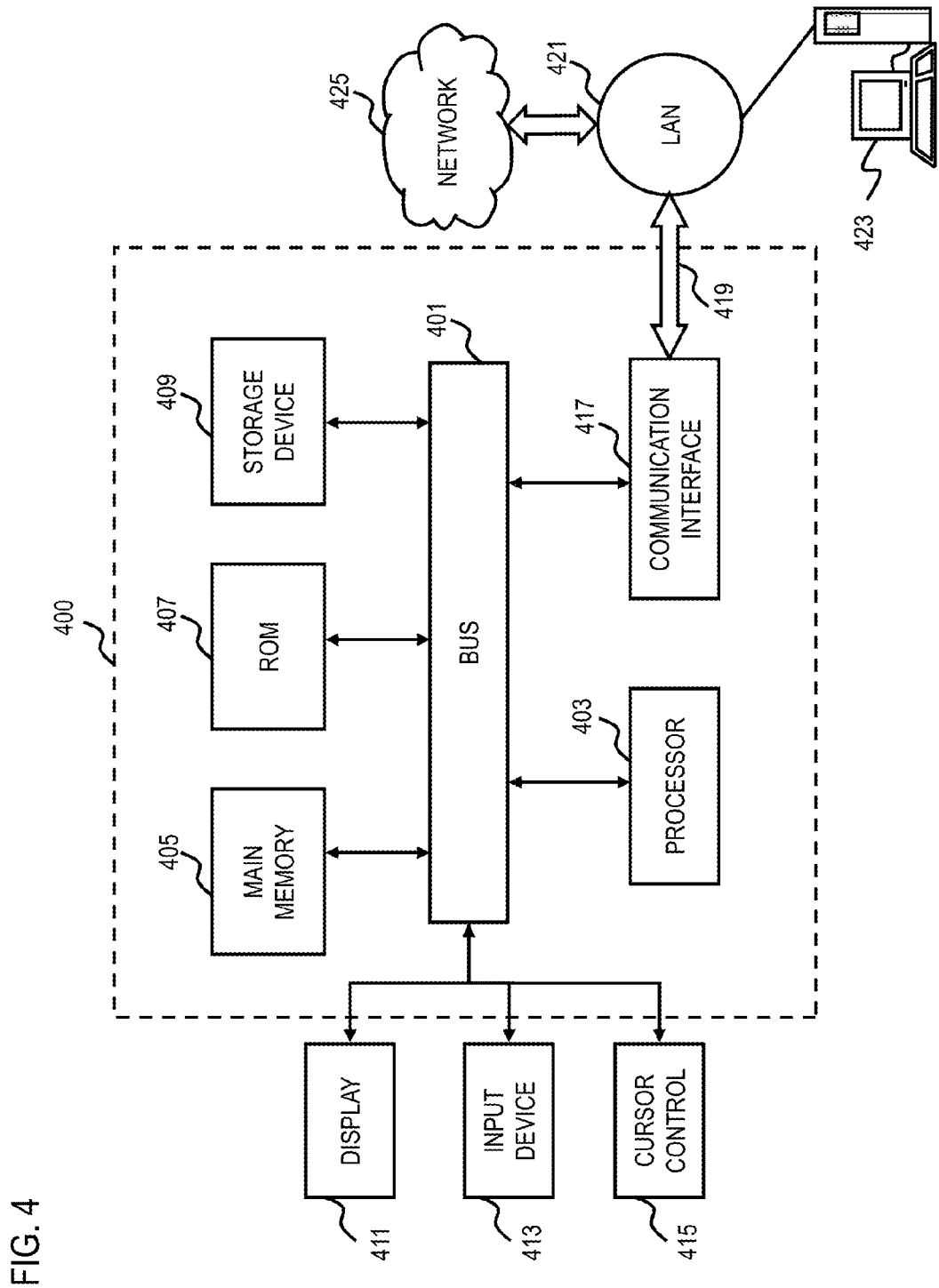
FIG. 4 is a diagram of a computer system that can be used to implement various exemplary embodiments.

FIG. 4 is a diagram of a computer system 400 that can be used to implement various exemplary embodiments. FIG. 4 illustrates computing hardware (e.g., computer system 400) upon which an embodiment according to the invention can be implemented. The computer system 400 includes a bus 401 or other communication mechanism for communicating information and a processor 403 coupled to the bus 401 for processing information. The computer system 400 also includes main memory 405, such as random access memory (RAM) or other dynamic storage device, coupled to the bus 401 for storing information and instructions to be executed by the processor 403. Main memory 405 also can be used for storing temporary variables or other intermediate information during execution of instructions by the processor 403. The computer system 400 may further include a read only memory (ROM) 407 or other static storage device coupled to the bus 401 for storing static information and instructions for the processor 403. A storage device 409, such as a magnetic disk or optical disk, is coupled to the bus 401 for persistently storing information and instructions.

The computer system 400 may be coupled via the bus 401 to a display 411, such as a cathode ray tube (CRT), liquid crystal display, active matrix display, or plasma display, for displaying information to a computer user. An input device 413, such as a keyboard including alphanumeric and other keys, is coupled to the bus 401 for communicating information and command selections to the processor 403. Another type of user input device is a cursor control 415, such as a mouse, a trackball, or cursor direction keys, for communicating direction information and command selections to the processor 403 and for controlling cursor movement on the display 411.

According to an embodiment of the invention, the processes described herein are performed by the computer system 400, in response to the processor 403 executing an arrangement of instructions contained in main memory 405. Such instructions can be read into main memory 405 from another computer-readable medium, such as the storage device 409. Execution of the arrangement of instructions contained in main memory 405 causes the processor 403 to perform the process steps described herein. One or more processors in a multi-processing arrangement may also be employed to execute the instructions contained in main memory 405. In alternative embodiments, hard-wired circuitry may be used in place of or in combination with software instructions to implement the embodiment of the invention. Thus, embodiments of the invention are not limited to any specific combination of hardware circuitry and software.

The computer system 400 also includes a communication interface 417 coupled to the bus 401. The communication interface 417 provides a two-way data communication coupling to a network link 419 connected to a local network 421. For example, the communication interface 417 may be a digital subscriber line (DSL) card or modem, an integrated services digital network (ISDN) card, a cable modem, a telephone modem, or any other communication interface to provide a data communication connection to a corresponding type of communication line. As another example, communication interface 417 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 417 sends and receives electrical, electromagnetic, or optical signals that carry digital data streams representing various types of information. Further, the communication interface 417 can include peripheral interface devices, such as a Universal Serial Bus (USB) interface, a PCMCIA (Personal Computer Memory Card International Association) interface, etc. Although a single communication interface 417 is depicted in FIG. 4, multiple communication interfaces can also be employed.

The network link 419 typically provides data communication through one or more networks to other data devices. For example, the network link 419 may provide a connection through the local network 421 to a host computer 423, which has connectivity to a network 425 (e.g. a wide area network (WAN) or the global packet data communication network now commonly referred to as the "Internet") or to data equipment operated by a service provider. The local network 421 and the network 425 both use electrical, electromagnetic, or optical signals to convey information and instructions. The signals through the various networks and the signals on the network link 419 and through the communication interface 417, which communicate digital data with the computer system 400, are exemplary forms of carrier waves bearing the information and instructions.

The computer system 400 can send messages and receive data, including program code, through the network(s), the network link 419, and the communication interface 417. In the Internet example, a server (not shown) might transmit requested code belonging to an application program for implementing an embodiment of the invention through the network 425, the local network 421 and the communication interface 417. The processor 403 may execute the transmitted code while being received and/or store the code in the storage device 409, or other non-volatile storage for later execution. In this manner, the computer system 400 may obtain application code in the form of a carrier wave.

The term "computer-readable medium" as used herein refers to any medium that participates in providing instructions to the processor 403 for execution. Such a medium may take many forms, including but not limited to non-volatile media, volatile media, and transmission media. Non-volatile media include, for example, optical or magnetic disks, such as the storage device 409. Volatile media include dynamic memory, such as main memory 405. Transmission media include coaxial cables, copper wire and fiber optics, including the wires that comprise the bus 401. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 5 is a diagram of a chip set 500 that can be used to implement various exemplary embodiments. FIG. 5 illustrates the chip set 500 upon which an embodiment of the invention may be implemented. Chip set 500 is programmed to provide an always-on-top user interface for a mobile application and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 500, or a portion thereof, constitutes a means for performing one or more steps of FIGS. 2A-2B.

In one embodiment, the chip set 500 includes a communication mechanism such as a bus 501 for passing information among the components of the chip set 500. A processor 503 has connectivity to the bus 501 to execute instructions and process information stored in, for example, a memory 505. The processor 503 may include one or more processing cores with each core configured to perform independently. A multi-core processor enables multiprocessing within a single physical package. Examples of a multi-core processor include two, four, eight, or greater numbers of processing cores. Alternatively or in addition, the processor 503 may include one or more microprocessors configured in tandem via the bus 501 to enable independent execution of instructions, pipelining, and multithreading. The processor 503 may also be accompanied with one or more specialized components to perform certain processing functions and tasks such as one or more digital signal processors (DSP) 507, or one or more application-specific integrated circuits (ASIC) 509. A DSP 507 typically is configured to process real-world signals (e.g., sound) in real time independently of the processor 503. Similarly, an ASIC 509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 503 and accompanying components have connectivity to the memory 505 via the bus 501. The memory 505 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 505 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
providing an always-on-top user interface mode for mobile applications, wherein the always-on-top user interface mode presents an active entry of at least one active session for one of the mobile applications that is always visible in a display of a mobile device;

rendering, on the display of the mobile device, user interface elements comprising one or more icons each representing one of the mobile applications from a forefront to a background based, at least in part, on a priority, wherein the priority is determined among a plurality of mobile applications currently executing on the mobile device based, at least in part, on frequencies of usage of the mobile applications, an active or inactive state of each of the mobile applications, one or more rendering characteristics of the user interface elements, or a combination thereof;

in response to receiving a user shrink-and-grab gesture applied on one of the user interface elements corresponding to one of the mobile applications on the display of the mobile device, activating the always-on-top user interface mode for the one mobile application and rendering the corresponding user interface element always visible in the display of the mobile device at a position and a shrunken size determined by the shrink-and-grab gesture; and in response to receiving a user drag-and-drop gesture for moving the user interface element in the shrunken size to a target position, rendering the user interface element in the shrunken size always visible and fixed to the target position in the display of the mobile device.

2. A method of claim 1, further comprising:

updating the priority with one or more updates to the frequencies of usage of the mobile applications, the one or more rendering characteristics of the user interface element in the display of the mobile device, or a combination thereof, wherein the user interface elements are rendered on the display of the mobile device based, at least in part, on the updated priority; and determining a rendering characteristic of the corresponding user interface element based on the user interface elements currently rendered on the display of the mobile device, the mobile applications executing on the mobile device, or a combination thereof, wherein the shrink-and-grab gesture includes a multi-touch interaction on the display of the mobile device by at least three fingers simultaneously, and wherein the one user interface element in the always-on-top user interface mode further presents a new graphic symbol.

3. A method of claim 2, further comprising:

determining the active state of the user interface elements, the mobile applications, or a combination thereof, wherein the rendering characteristics of the user interface elements are further based on the active state, and wherein the priority is further determined based on the active or inactive state of each of the mobile applications, and the inactive state is determined based a decrease of user inputs per a predetermined length of time.

4. A method of claim 2, further comprising:

determining one or more interactions with the user interface elements, the mobile applications, or the combination thereof, wherein the frequencies of usage of the mobile applications include frequencies of the one or more interactions to the mobile applications.

5. A method of claim 1, wherein the shrink-and-grab gesture further determines a zoom level of the corresponding user interface element in the always-on-top user interface mode, and wherein the one user interface element in the always-on-top user interface mode further presents a top entry that was presented in the one user interface element prior to the shrink-and-grab gesture.

6. A method of claim 5, further comprising:

in response to a user entry gesture applied on the one user interface element in the always-on-top user interface mode, presenting a new active entry in the one user interface element in the always-on-top user interface mode and omitting the top entry therefrom to maintain the shrunken size.

7. A method of claim 6, further comprising:

in response to the user entry gesture, adding a keyboard user interface element to the one user interface element in the always-on-top user interface mode; and omitting the keyboard user interface element from the one user interface element in the always-on-top user interface mode, when determining the new active entry is finished.

8. A method of claim 1, wherein the rendering characteristics of the display include one or more supported resolutions, positions in the display of the mobile device, a display size, a display type, one or more zoom levels, one or more colors, one or more transparencies, one or more supported rendering speeds, one or more supported touch input methods, or a combination thereof.

9. A method of claim 1, further comprising:

disabling the always-on-top interface mode so that the corresponding user interface element is no longer rendered on the display of the mobile device, wherein the corresponding user interface element includes a widget.

10. A method of claim 1, wherein the always-on-top user interface mode is (a) supported natively by the one mobile application; (b) supported by an operating system of the mobile device; or (c) a combination thereof, and wherein the priority is determined based on one or more user specified criteria that specify the frequencies of usage of the mobile applications, the content, the one or more rendering characteristics of the user interface element in the display of the mobile device, or a combination thereof.

11. An apparatus comprising:

a processor; and a memory including computer program code for one or more programs, the memory and the computer program code configured to, with the processor, cause the apparatus to perform the following, provide an always-on-top user interface mode for mobile applications, wherein the always-on-top user interface mode presents an active entry of at least one active session for one of the mobile applications that is always visible in a display of a mobile device;

render, on the display of the mobile device, user interface elements comprising one or more icons each representing one of the mobile applications from a forefront to a background based, at least in part, on a priority, wherein the priority is determined among a plurality of mobile applications currently executing on the mobile device based, at least in part, on frequencies of usage of the mobile applications, an active or inactive state of each of the mobile applications, one or more rendering characteristics of the user interface elements, or a combination thereof;

on a mobile device, wherein the priority is determined based, at least in part, on frequencies of usage of the mobile applications, content, one or in response to receiving a user shrink-and-grab gesture applied on one of the user interface elements corresponding to one of the mobile applications on the display of the mobile device, activate the always-on-top user interface mode for the one mobile application and render the corresponding user interface element always visible in the display of the mobile device at a position and a shrunken size determined by the shrink-and-grab gesture; and in response to receiving a user drag-and-drop gesture for moving the user interface element in the shrunken size to a target position, rendering the user interface element in the shrunken size always visible and fixed to the target position in the display of the mobile device.

12. An apparatus of claim 11, wherein the apparatus is further caused to:
determine a rendering characteristic of the corresponding user interface element based on one or more other user interface elements currently rendered on the display of the mobile device, one or more other mobile applications executing on the mobile device, or a combination thereof.

13. An apparatus of claim 12, wherein the apparatus is further caused to:
determine the active state of the one or more other user interface elements, the one or more other mobile applications, or a combination thereof,
wherein the rendering characteristics of the corresponding user interface element is further based on the active state.

14. An apparatus of claim 12, wherein the apparatus is further caused to:
determine one or more interactions with the corresponding user interface element to determine the rendering characteristic of the corresponding user interface element,
wherein the one or more interactions include a multi-touch gesture interaction.

15. An apparatus of claim 12, wherein the rendering characteristic of the corresponding user interface element includes a position in the display of the mobile device, a size, a zoom level, or a combination thereof.

16. An apparatus of claim 11, wherein the apparatus is further caused to:
determine the user shrink-and-grab gesture for activating the always-on-top user interface mode based on a multi-touch gesture interaction.

17. An apparatus of claim 11, wherein the corresponding user interface element includes a widget.

18. An apparatus of claim 11, wherein the always-on-top user interface mode is (a) supported natively by the one mobile application; (b) supported by an operating system of the mobile device; or (c) a combination thereof.

19. A system comprising:
one or more servers; and
one or more mobile devices selectively connected with one or more servers via one or more networks, each of the mobile devices including an always-on-top module configured to:
provide an always-on-top user interface mode for mobile applications, wherein the always-on-top user interface mode presents an active entry of at least one active session for one of the mobile applications that is always visible in a display of a mobile device;
render, on the display of the mobile device, user interface elements comprising one or more icons each representing one of the mobile applications from a forefront to a background based, at least in part, on a priority, wherein the priority is determined among a plurality of mobile applications currently executing on the mobile device based, at least in part, on frequencies of usage of the mobile applications, an active or inactive state of each of the mobile applications, one or more rendering characteristics of the user interface elements, or a combination thereof;
in response to a receiving user shrink-and-grab gesture applied on one of the user interface elements corresponding to one of the mobile applications on the display of the mobile device, activate the always-on-top user interface mode for the one mobile application and render the corresponding user interface element always visible in the display of the mobile device at a position and a shrunken size determined by the shrink-and-grab gesture; and
in response to receiving a user drag-and-drop gesture for moving the user interface element in the shrunken size to a target position, rendering the user interface element in the shrunken size always visible and fixed to the target position in the display of the mobile device.

20. A system of claim 19, wherein the always-on-top module is further configured to:
determine a rendering characteristic of the corresponding user interface element based on one or more other user interface elements currently rendered on the display of the mobile device, one or more other mobile applications executing on the each mobile device, or a combination thereof.

* * * * *